US007852504B2

(12) United States Patent
Tanaka

(10) Patent No.: US 7,852,504 B2
(45) Date of Patent: Dec. 14, 2010

(54) IMAGE FORMING DEVICE, PRINT JOB TRANSMISSION DEVICE, DATA MANAGEMENT DEVICE, PROGRAM, STORAGE MEDIUM AND METHOD FOR SUPPLYING PRINT SHEET

(75) Inventor: Yoshiaki Tanaka, Uji (JP)

(73) Assignee: Sharp Kabushiki Kaisha, Osaka (JP)

( * ) Notice: Subject to any disclaimer, the term of this patent is extended or adjusted under 35 U.S.C. 154(b) by 1171 days.

(21) Appl. No.: 10/988,323

(22) Filed: Nov. 12, 2004

(65) Prior Publication Data

US 2005/0105146 A1 May 19, 2005

(30) Foreign Application Priority Data

Nov. 13, 2003 (JP) ............................ 2003-384178

(51) Int. Cl.
*G06F 3/12* (2006.01)
*H04N 1/60* (2006.01)
*G03G 15/00* (2006.01)
*B65H 3/44* (2006.01)
*B65H 5/26* (2006.01)

(52) U.S. Cl. ......................... 358/1.15; 358/1.9; 399/45; 399/405; 271/9.01; 271/9.05

(58) Field of Classification Search ....... 358/1.15–1.18, 358/1.9; 399/45, 405; 271/9.01, 9.05
See application file for complete search history.

(56) References Cited

U.S. PATENT DOCUMENTS 6,348,971 B2 * 2/2002 Owa et al. ................. 358/1.15
6,570,667 B1 * 5/2003 Hattori et al. .............. 358/1.15
6,714,747 B2 * 3/2004 Asai ............................ 399/45
7,023,565 B1 4/2006 Hino
7,242,490 B1 * 7/2007 Palmer et al. .............. 358/1.15

(Continued)

FOREIGN PATENT DOCUMENTS

JP 07-141134 6/1995

(Continued)

*Primary Examiner*—Twyler L Haskins
*Assistant Examiner*—Satwant K Singh
(74) *Attorney, Agent, or Firm*—David G. Conlin; Steven M. Jensen; Edwards Angell Palmer & Dodge LLP

(57) ABSTRACT

When the image forming device receives a print job including a print condition in its header, an operation control section extracts the print condition from the header, and makes an inquiry to a server. The server extracts an order table, indicative of a priority based on the extracted print condition, from a setting table in which a priority of sheets has been set in advance in accordance with the extracted print condition, and sends the order table by return to the image forming device. In the image forming device, a tray selection section generates a tray selection signal in accordance with the received order table and a detection signal, outputted from a tray detection section, which functions as sheet storage information of a sheet feeding tray section, so as to send the tray selection signal by return to the sheet feeding tray section. The sheet feeding tray section supplies a sheet, corresponding to the print condition, from a tray selected in accordance with the tray selection signal to a printer engine. Thus, it is possible to select an appropriate sheet in accordance with the print condition and to print an image on the appropriate sheet.

21 Claims, 9 Drawing Sheets

U.S. PATENT DOCUMENTS

| | | | | |
|---|---|---|---|---|
| 7,355,733 | B2 * | 4/2008 | Sommer et al. | 358/1.15 |
| 7,557,950 | B2 * | 7/2009 | Hatta et al. | 358/1.9 |
| 2001/0007619 | A1 | 7/2001 | Kakutani | |
| 2002/0089683 | A1 | 7/2002 | Moro et al. | |
| 2003/0204591 | A1 * | 10/2003 | Ueda et al. | 709/224 |
| 2006/0109528 | A1 | 5/2006 | Hino | |

FOREIGN PATENT DOCUMENTS

| | | |
|---|---|---|
| JP | 09-311769 | 12/1997 |
| JP | 10-049318 | 2/1998 |
| JP | 11-191043 | 7/1999 |
| JP | 11-227294 | 8/1999 |
| JP | 11-249846 | 9/1999 |
| JP | 2000-225753 | 8/2000 |
| JP | 2001-018496 | 1/2001 |
| JP | 2001-080176 | 3/2001 |
| JP | 2001-191618 | 7/2001 |
| JP | 2001-199577 | 7/2001 |
| JP | 2001-202221 | 7/2001 |
| JP | 2001-328740 | 11/2001 |
| JP | 2002-067446 | 3/2002 |
| JP | 2002-215372 | 8/2002 |
| JP | 2003-032487 | 1/2003 |
| JP | 2003-125156 | 4/2003 |
| JP | 2003-216384 | 7/2003 |
| JP | 2003-271367 | 9/2003 |

* cited by examiner

FIG. 5

| USER NAME | HOST NAME | PRINTER | APPLICATION NAME | COLOR SPECIFYING INFORMATION | PRIORITY | SHEET TYPE |
|---|---|---|---|---|---|---|
| USER X | HOST 3A | PRINTER 2A | Write | COLOR | 1 | NORMAL PAPER |
| | | | | | 2 | RECYCLED PAPER |
| | | | | | 3 | THIN PAPER |
| | | | | | 4 | - |
| | | | | MONOCHROME | 1 | RECYCLED PAPER |
| | | | | | 2 | NORMAL PAPER |
| | | | | | 3 | THIN PAPER |
| | | | | | 4 | - |
| | | | Presentation | COLOR | 1 | NORMAL PAPER |
| | | | | | 2 | - |
| | | | | | 3 | - |
| | | | | | 4 | - |
| | | | | MONOCHROME | 1 | NORMAL PAPER |
| | | | | | 2 | RECYCLED PAPER |
| | | | | | 3 | - |
| | | | | | 4 | - |
| | | | Photo | COLOR | 1 | PHOTOGRAPH PAPER |
| | | | | | 2 | - |
| | | | | | 3 | - |
| | | | | | 4 | - |
| | | | | MONOCHROME | 1 | NORMAL PAPER |
| | | | | | 2 | PHOTOGRAPH PAPER |
| | | | | | 3 | - |
| | | | | | 4 | - |
| | | PRINTER 2B | Write | COLOR | 1 | NORMAL PAPER |
| | | | | | 2 | - |
| | | | | MONOCHROME | 1 | RECYCLED PAPER |
| | | | | | 2 | NORMAL PAPER |
| | | | Presentation | COLOR | 1 | NORMAL PAPER |
| | | | | | 2 | - |
| | | | | MONOCHROME | 1 | NORMAL PAPER |
| | | | | | 2 | RECYCLED PAPER |
| | | | Photo | COLOR | 1 | NORMAL PAPER |
| | | | | | 2 | - |
| | | | | MONOCHROME | 1 | NORMAL PAPER |
| | | | | | 2 | RECYCLED PAPER |

FIG. 6

| USER NAME | HOST NAME | PRINTER | APPLICATION NAME | COLOR SPECIFYING INFORMATION | PRIORITY | SHEET TYPE |
|---|---|---|---|---|---|---|
| USER X | HOST 3B | PRINTER 2A | Write | COLOR | 1 | NORMAL PAPER |
| | | | | | 2 | RECYCLED PAPER |
| | | | | | 3 | - |
| | | | | | 4 | - |
| | | | | MONOCHROME | 1 | RECYCLED PAPER |
| | | | | | 2 | NORMAL PAPER |
| | | | | | 3 | - |
| | | | | | 4 | - |
| | | | Presentation | COLOR | 1 | NORMAL PAPER |
| | | | | | 2 | - |
| | | | | | 3 | - |
| | | | | | 4 | - |
| | | | | MONOCHROME | 1 | NORMAL PAPER |
| | | | | | 2 | RECYCLED PAPER |
| | | | | | 3 | - |
| | | | | | 4 | - |
| | | | Photo | COLOR | 1 | PHOTOGRAPH PAPER |
| | | | | | 2 | - |
| | | | | | 3 | - |
| | | | | | 4 | - |
| | | | | MONOCHROME | 1 | NORMAL PAPER |
| | | | | | 2 | - |
| | | | | | 3 | - |
| | | | | | 4 | - |
| | | PRINTER 2B | Write | COLOR | 1 | NORMAL PAPER |
| | | | | | 2 | - |
| | | | | MONOCHROME | 1 | RECYCLED PAPER |
| | | | | | 2 | - |
| | | | Presentation | COLOR | 1 | NORMAL PAPER |
| | | | | | 2 | - |
| | | | | MONOCHROME | 1 | NORMAL PAPER |
| | | | | | 2 | RECYCLED PAPER |
| | | | Photo | COLOR | 1 | NORMAL PAPER |
| | | | | | 2 | - |
| | | | | MONOCHROME | 1 | NORMAL PAPER |
| | | | | | 2 | RECYCLED PAPER |

| | HOST | APPLICATION | COLOR/MONOCHROME |
|---|---|---|---|
| NORMAL PAPER | – | – | – |
| RECYCLED PAPER | – | – | – |
| THIN PAPER | HOST 3C | – | – |
| PHOTOGRAPH PAPER | HOST 3C、HOST 3D | TEXT | MONOCHROME |

IMAGE FORMING DEVICE, PRINT JOB TRANSMISSION DEVICE, DATA MANAGEMENT DEVICE, PROGRAM, STORAGE MEDIUM AND METHOD FOR SUPPLYING PRINT SHEET

This Nonprovisional application claims priority under 35 U.S.C. §119(a) on Patent Application No. 2003/384178 filed in Japan on Nov. 13, 2003, the entire contents of which are hereby incorporated by reference.

FIELD OF THE INVENTION

The present invention relates to an image forming device, a print job transmission device, a data management device, a program, a storage medium and a method for supplying a print sheet, whereby a sheet is selected from sheets stored in a plurality sheet trays and thus selected sheet is printed.

BACKGROUND OF THE INVENTION

Currently, an image forming device provided with a plurality of sheet trays is widely used as an image forming device such as a multi-functional device having a printing function and a copying function. When receiving a print job from a print job transmission device such as a personal computer on which a printer driver has been installed, the image forming device selects a sheet tray and print an image on a sheet specified by the print job.

In such an image forming device, when the sheet specified by the print job is not stored in the device, a substitutional sheet is fed in accordance with a priority that has been set in advance, thereby printing an image. Note that, Japanese Publication for Unexamined Publication No. 328740/2001 (Tokukai 2001-328740) (published on Nov. 27, 2001) recites a technique in which: a sheet is selected in accordance with a priority, that has been set in advance, when a print job is set to allow any sheet to be fed regardless of a sheet type.

However, the aforementioned conventional art raises the following problem: Even in case where a plurality of users respectively desire priorities different from each other, a sheet is selected in accordance with a single priority that has been set with respect to a printer, so that an image may be printed on a sheet that is not desired by a user.

Further, the aforementioned conventional art raises the following problem: for example, in order to prevent the foregoing problem, it is necessary that users sharing the image forming device reach an agreement in terms of a priority set in the image forming device, so that the users have to take troubles in reaching the agreement.

Also, the aforementioned conventional art raises the following problem: for example, even in case where a single user desires a different priority according to a print condition such as an application program to be used and color to be specified at the time of printing, a sheet is selected in accordance with a single priority that has been set in advance, so that an image may be printed on a sheet that is not desired by the user.

SUMMARY OF THE INVENTION

The present invention was made from the foregoing view point, and an object of the present invention is to provide an image forming device, a print job transmission device, a data management device, a program, a storage medium and a method for supplying a print sheet, whereby an image is printed on a sheet desired by a user even when a different priority is desired according to a print condition.

In order to achieve the foregoing object, an image forming device according to the present invention includes: a transmission/reception section which functions as an interface to a network; a control section for generating a tray selection signal in accordance with a print job inputted to the transmission/reception section, said print job including a print condition indicative of a condition for printing; and a sheet feeding tray section, having a plurality of sheet trays storing sheets therein, which supplies a sheet from one of the sheet trays that has been selected in accordance with the tray selection signal transmitted from the control section, wherein the control section includes: an operation control section for extracting the print condition from the print job and for obtaining an order table, indicative of a priority based on the print condition that has been extracted, from setting information, indicative of a sheet type priority corresponding to the print condition; and a tray selection section for generating the tray selection signal for selecting one of the sheet trays, in accordance with the order table transmitted from the operation control section.

When the image forming device receives the print job via the transmission/reception section, the image forming device selects a sheet in accordance with the priority based on the print condition specified in the print job. According to the arrangement, it is possible to set the sheet type priority corresponding to the print condition, so that it is possible to record an image on a sheet desired by a user. Thus, it is possible to surely select an appropriate sheet.

In order to achieve the foregoing object, the image forming device according to the present invention includes: a sheet feeding section, having a plurality of sheet trays for storing print sheets therein, which supplies a print sheet from one of the sheet trays; an operation control section for selecting an order table, based on a print condition, from a plurality of order tables each of which indicates a sheet priority corresponding to the print condition; and a tray selection section for selecting one of the sheet trays, in accordance with the order table selected by the operation control section, so as to supply the print sheet from thus selected sheet tray.

The image forming device selects a sheet in accordance with the priority based on the print condition. According to the arrangement, it is possible to set the sheet type priority corresponding to the print condition, so that it is possible to record an image on a sheet desired by a user. Thus, it is possible to surely select an appropriate sheet.

In order to achieve the foregoing object, the print job transmission device according to the present invention includes: a transmission/reception section which functions as an interface to a network; and a print control section for commanding an image forming device, whose connection to the print control section via the network is allowed by the transmission/reception section, to execute a print job including a print condition indicative of a condition for printing, wherein the print control section includes a registration section for registering a registration table, indicative of a sheet type priority corresponding to the print condition concerning the image forming device, to a second storage section of the image forming device before commanding the image forming device to execute the print job, so as to cause the image forming device to obtain an order table, indicative of a priority based on the print condition included in the print job, from the registration table in accordance with the print condition included in the print job which the image forming device has been commanded to execute.

According to the arrangement, the print job transmission device registers the registration table for obtaining the priority into the second storage section of the image forming device in advance, so that it is possible to cause the image forming device to surely obtain the order table. Further, it is possible to select a sheet in accordance with the print condition by combining the print job transmission device with the image forming device.

In order to achieve the foregoing object, the print job transmission device according to the present invention includes: a transmission/reception section which functions as an interface to a network; and a print control section for commanding an image forming device, whose connection to the print control section via the network is allowed by the transmission/reception section, to execute a print job including a print condition indicative of a condition for printing, wherein the print control section includes a registration section for registering setting information, indicative of a sheet type priority corresponding to the print condition, to a first storage section of a data management device whose connection to the print control section via the network is allowed by the transmission/reception section, before commanding the image forming device to execute the print job, so as to cause the image forming device to obtain an order table, indicative of a priority based on the print condition included in the print job which the image forming device has been commanded to execute, from the first storage section of the data management device, in accordance with the setting information and the print condition included in the print job.

According to the arrangement, the print job transmission device registers the registration table for obtaining the priority into the first storage section of the data management device in advance, so that it is possible to cause the image forming device to access the data management device and to surely obtain the order table. Further, it is possible to select a sheet in accordance with the print condition by combining the job transmission device with the image forming device and the data management device.

In order to achieve the foregoing object, the print job transmission device according to the present invention includes: a transmission/reception section which functions as an interface to a network; and a print control section for commanding an image forming device, whose connection to the print control section via the network is allowed by the transmission/reception section, to execute a print job including a print condition indicative of a condition for printing, wherein the print control section includes a command section for adding the print condition having at least any one of (i) device information concerning a main body of the print job transmission device, (ii) user information concerning a user who has given a command instruction to execute the print job by using the main body of the print job transmission device, (iii) application information concerning an application by which image data included in the print job is generated in the main body of the print job transmission device, and (iv) color specifying information in printing an image on the basis of the print job, to the print job so that the print information is extractable, so as to cause the image forming device, which has been commanded to execute the print job, to select a sheet type in accordance with a priority corresponding to the print condition included in the print job.

According to the arrangement, it is possible to appropriately select a different sheet type in accordance with at least any one of (i) the device by which the image forming device has been commanded to execute the print job, (ii) the user who has given the command, (iii) the application by which image data has been generated, and (iv) the color specifying information.

In order to achieve the foregoing object, the data management device according to the present invention includes a transmission/reception section which functions as an interface to a network, whose connection to an image forming device via the network is allowed by the transmission/reception section, and the data management device includes: a first storage section for storing setting information indicative of a sheet type priority corresponding to a print condition, indicative of a condition for printing, which is included in a print job which the image forming device is commanded to execute; and a control section for managing the setting information.

In case where an inquiry for specifying the print condition is made by the image forming device, the data management device refers to the setting information stored in the first storage section, and obtains the priority concerning the print condition, thereby sending the setting information by return to the image forming device. Thus, it is possible to cause the image forming device to select a sheet type corresponding to the priority and to print an image on the selected sheet. Further, it is possible to cause the data management device to collectively manage the setting information concerning a plurality of image forming devices.

In order to achieve the foregoing object, the method according to the present invention for supplying a print sheet from a sheet tray selected from a plurality of sheet trays for storing print sheets therein is a method which includes the steps of: obtaining an order table indicative of a priority based on a desired print condition from setting information, indicative of a sheet type priority corresponding to a print condition, that is stored in a storage section; and selecting a sheet tray from the plurality of sheet trays in accordance with the order table so as to supply the print sheet from the sheet tray that has been selected.

According to the method, it is possible to select a print sheet in accordance with the desired priority corresponding to the print condition and to print an image on the selected print sheet.

For a fuller understanding of the nature and advantages of the invention, reference should be made to the ensuing detailed description taken in conjunction with the accompanying drawings.

BRIEF DESCRIPTION OF THE DRAWINGS

FIG. 5 shows a part of an example of a setting table stored in the data management device.

FIG. 6 shows other part of the setting table stored in the data management device.

DESCRIPTION OF THE EMBODIMENTS

The following description will explain an embodiment of the present invention with reference to FIG. 1 to FIG. 11.

Figure 1:
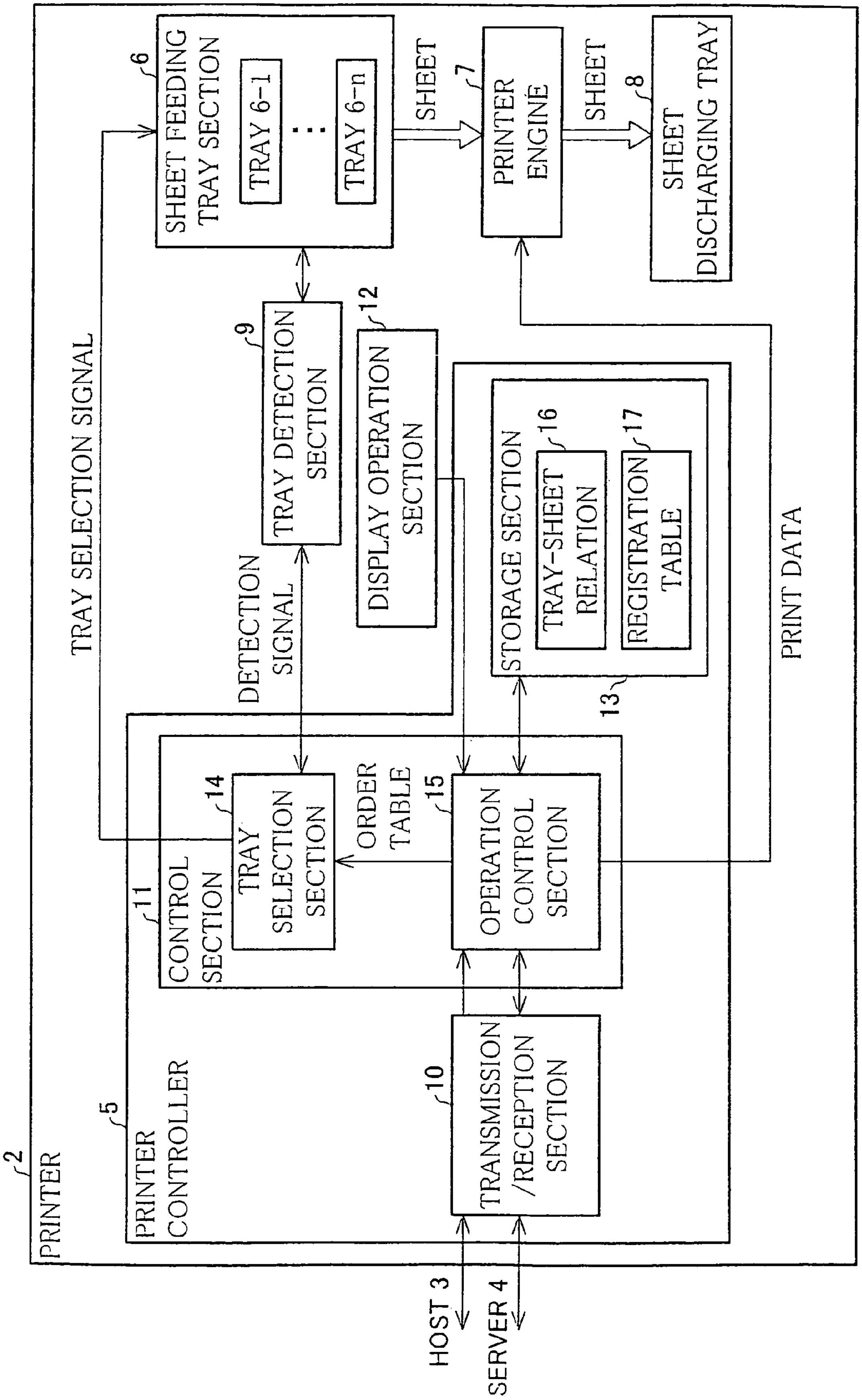
FIG. 1 is a block diagram showing an embodiment of an image forming device according to the present invention.
Figure 2:
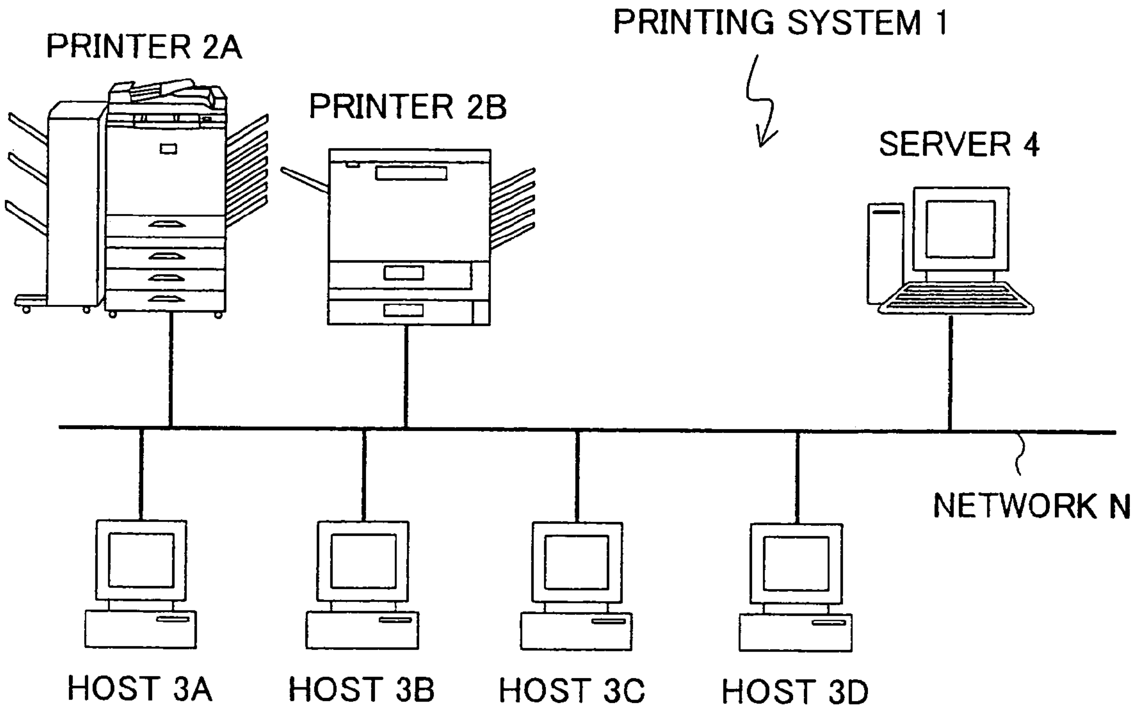
FIG. 2 schematically shows a connection condition of a print system including the image forming device.

As shown in FIG. 2, a print system (image forming system) 1 of the present embodiment includes: printers (image forming devices) 2A and 2B; hosts (print job transmission devices) 3A, 3B, 3C, and 3D; and a server (data management device) 4. These devices are connected to each other via a network N as LAN (Local Area Network).

Each of the printers 2A and 2B records an image based on image data of a print job received via the network N onto a sheet (print sheet, print paper). The hosts 3A to 3D are computers connected to the network N. A plurality of application softwares are installed on each of them. A user of each of the hosts 3A to 3D makes each of the printers 2A and 2B print an image based on image data generated by using an application software. The server 4 is a device for managing a print setting of each of the printers 2A and 2B. The server 4 will be detailed later.

Each of the printers 2A and 2B is provided with a plurality of sheet feeding trays, and records an image based on a desired print job onto a sheet supplied from a sheet tray, selected from a sheet feeding tray section, which has a specified sheet, in accordance with an instruction given by a user using any one of the hosts 3A to 3D. Here, the printers 2A and 2B have similar functions, so that they are collectively referred to as a printer 2 except for a case of particularly distinguishing them from each other. Further, also the hosts 3A to 3D have similar functions, so that they are collectively referred to as a host 3 except for a case of particularly distinguishing them from each other.

When there is no sheet specified by the inputted print job or the sheets specified by the inputted print job run out, the printer 2 of the print system 1 prints an image onto a substitutional sheet selected in accordance with a priority that has been set in the print system 1 in advance. Here, it is possible to set a different priority of the printer 2 according to various print conditions such as an application by which the job has been generated. Data concerning the priority may be registered to any device of the print system 1. In the present embodiment, data concerning the printers 2A and 2B are registered from the host 3 to the printers 2A and 2B, and thus registered data are obtained by the server 4.

Further, when a print job including data concerning a print condition is inputted to the printer 2 from the host 3, the printer 2 access the server 4 and obtains data concerning a priority, so as to select a sheet in accordance with the priority, thereby printing an image. In case where a print sheet is specified in the print condition, the specified print sheet is most prioritized.

The respective devices of the print system 1 are detailed as follows. First, the printer 2 is detailed with reference to FIG. 1.

The printer 2 schematically includes a printer controller (control board) 5, a sheet feeding tray section 6, a printer engine (image forming section) 7, a sheet discharging tray 8, a tray detection section 9, and a display operation section 12.

The printer controller 5 is a control board provided on the printer 2. The printer controller 5 will be described later.

The sheet feeding tray section 6 is a sheet storage section having trays (sheet trays) 6-1 to 6-n each of which stores sheets. Here, n is an integer of not less than 2. The sheet feeding tray section 6 selects any one of the trays 6-1 to 6-n in accordance with an inputted tray selection signal, and supplies a sheet from thus selected tray to the printer engine 7. Note that, the printers 2A and 2B are different from each other in that: the printer 2A includes four trays (n=4) in the sheet feeding tray section 6, but the printer 2B includes two trays (n=2) in the sheet feeding tray section 6.

The printer engine 7 prints an image onto a sheet supplied from the sheet feeding tray 6 in accordance with print data. The sheet on which the image has been printed is transported to the sheet discharging tray 8. The sheet discharging tray 8 is a tray on which a sheet having an image is stacked.

The tray detection section 9 is a detector which detects (i) whether or not there are sheets in the trays 6-1 to 6-n of the sheet feeding tray section 6 and (ii) sizes of the sheets stored in the trays 6-1 to 6-n. The display operation section 12 functions as a display section and an operation section of the printer 2. The display operation section 12 of the present embodiment is a touch panel.

Here, the printer controller 5 is described. More specifically, the printer controller 5 includes a transmission/reception section 10, a-control section 11, and a storage section (second storage section) 13.

The transmission/reception section 10 is an interface device through which the printer 2 transmits and receives data. The transmission/reception section 10 is constituted of a connector and a buffer (not shown).

The control section 11 controls the printer 2. The control section 11 includes a tray selection section 14 and an operation control section 15. Note that, the control section 11 of the present embodiment is constituted of a software such as ASIC (Application Specific Integrated Circuit), but an arrangement thereof is not limited to this. The control section 11 may be realized by (i) a program stored in a memory and (ii) a processor.

The tray selection section 14 selects a sheet tray, from which a sheet is supplied to the printer engine 7, from the sheet trays 6-1 to 6-n. The tray selection section 14 generates a tray selection signal used in the sheet feeding tray section 6. In more detail, when the tray selection section 14 receives an order table from the operation control section 15, the tray selection section 14 transmits a detection instruction signal to the tray detection section 9. The tray detection section 9 detects whether or not there are sheets in the trays 6-1 to 6-n of the sheet feeding tray section 6 in response to the detection instruction signal of the tray detection section 9, and transmits thus obtained detection result to the tray selection section 14 as a detection signal. The tray selection section 14 generates a tray selection signal for selecting a tray, which is most prioritized and has sheets therein, in accordance with the order table and the detection signal transmitted from the tray detection section 9. Here, the detection signal transmitted from the tray detection section 9 is a signal for detecting that the sheets stored in the tray run out. Thus, the tray selection section 14 asks the tray detection section 9 for a detection signal at each time an image is printed on a single sheet, thereby obtaining the detection signal.

The operation control section 15 controls a printing operation in the printer 2. When the operation control section 15 receives the print job via the transmission/reception section 10, the operation control section 15 separates a print condition and image data for printing, both of which are included in the print job, from each other, and the operation control section 15 extracts the print condition and the image data respectively. For example, in case where a part corresponding to the print condition of the print job is a header, the header is extracted as the print condition, and a part other than the header is obtained as the image data. The operation control section 15 converts the image data into print data which causes the printer engine 7 to print an image, and transmits the print data to the printer engine 7, thereby printing an image.

Figure 4:
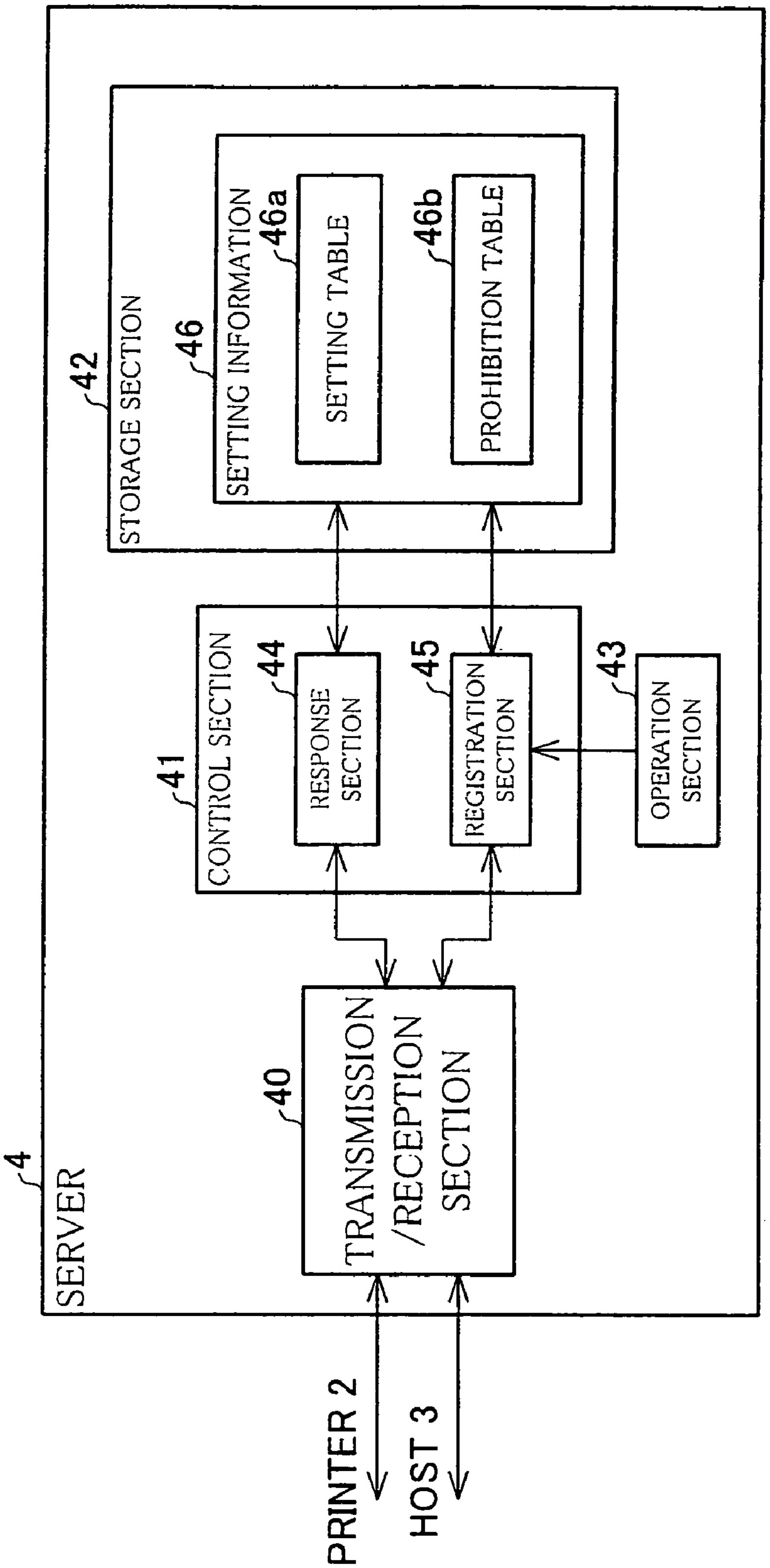
FIG. 4 is a block diagram showing an embodiment of a data management device according to the present invention.

Further, the operation control section 15 accesses the server 4 via the transmission/reception section 10 so as to give an inquiry to the server 4 by using the extracted print condition. This inquiry is received by a response section 44 of a control section 41 of the server 4 that is shown in FIG. 4. The response section 44 extracts an order table, indicative of a priority based on a print condition corresponding to the inquiry, from setting information 46 stored in a storage section 42 (first storage section), and sends thus extracted order table by return to the printer 2. The setting information 46 is obtained as follows: the server 4 accesses the printers 2A and 2B and obtains a sheet type priority corresponding to each print condition that has been stored in the storage section 13 of the printer 2 as a registration table 17, and the sheet type priority is stored in the storage section 42 as the setting information 46. The setting information 46 includes a plurality of order tables each of which has a sheet priority that has been set for each of print conditions of the printers 2A and 2B in advance. When the operation control section 15 of the printer 2 receives the order table from the server 4, the operation control section 15 converts the sheet type order table into data concerning a tray by using a tray-sheet relation 16 stored in the storage section 13. The operation control section 15 transmits thus converted order table to the tray selection section 14. Note that, the "sheet type" is distinction for indicating that the sheet is a normal paper, or a recycled paper, or a thin paper, or a photograph paper, for example.

Further, in case where the print condition extracted from the print job includes the sheet type information used in the printing, the operation control section 15 sets the sheet type to be most prioritized in the order table.

In FIG. 1 again, the storage section 13 is a data storage device of the printer 2. The storage section 13 stores the tray-sheet relation 16 and the registration table 17. Here, the tray-sheet relation 16 indicates a relationship between (i) the trays 6-1 to 6-n and (ii) types of sheets stored in the trays 6-1 to 6-n in the sheet feeding tray 6 of the printer 2. The tray-sheet relation 16 specifically shows, for example, that: normal papers are stored in the tray 6-1, and recycled papers are stored in the tray 6-2, and thin papers are stored in the tray 6-3, and photograph papers are stored in the tray 6-4. Note that, the present invention is not limited to an arrangement in which a single sheet tray stores a single type of sheets. Of course, the single type sheets may be stored in a plurality of sheet trays. For example, it may be so arranged that the trays 6-1 and 6-2 respectively store normal papers. By using the tray-sheet relation 16, it is possible to select an appropriate tray in accordance with the sheet type priority.

Further, the registration table 17 indicates the sheet type priority for each print condition with respect to only the printer 2. The registration table 17 includes a plurality of order tables, each indicative of a sheet type priority, that are set so as to correspond to each print condition of the printer 2. The registration table 17 is registered from the host 3 to the storage section 13. The registration of the registration table 17 will be described later.

Figure 3:
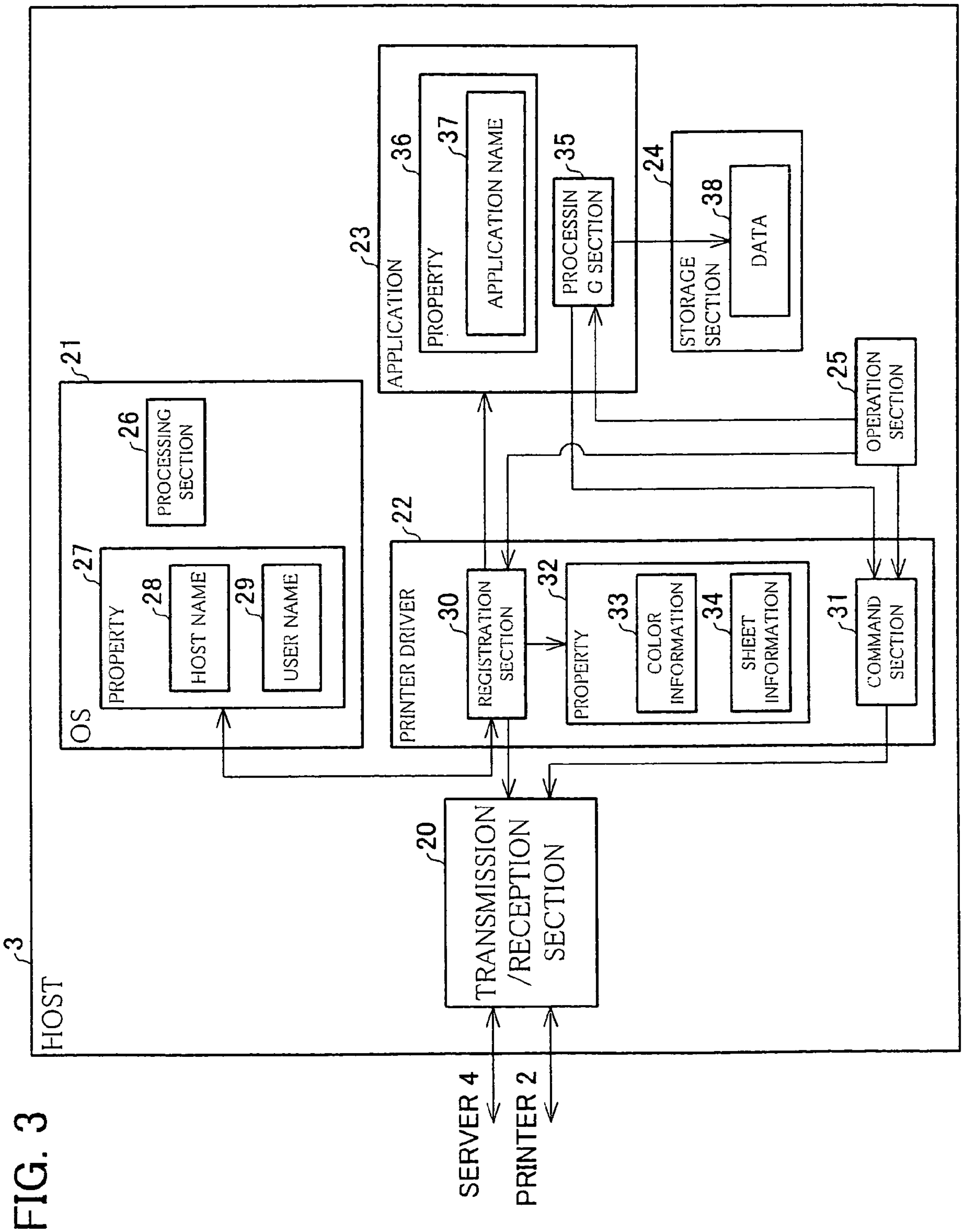
FIG. 3 is a block diagram showing an embodiment of a print job transmission device according to the present invention.

Next, the host 3 is described with reference to FIG. 3. The host 3 schematically includes a transmission/reception section 20, an OS (operating system) 21, a printer driver (print control section) 22, an application 23, a storage section 24 (third storage section), and an operation section 25.

The transmission/reception section 20 is an interface device for transmitting and receiving data of the host 3. The transmission/reception section 20 is constituted of a connector and a buffer (not shown).

The OS21 is a function block for carrying out an entire process of the host 3, and is realized by causing a CPU (Central Processing Unit) (not shown) to read and execute a program stored in a storage device (not shown).

The OS21 includes a processing section 26 and a property 27. The processing section 26 carries out an entire operation of the host 3. The property 27 is a property obtaining section for obtaining information by accessing a storage section (not shown). The property 27 obtains setting data used by the processing section 26 and the like of the OS21. In order to facilitate the description, also the obtained setting data is referred to as the property 27.

The property 27 includes a host name (device information) 28 and a user name (user information) 29. The host name is a name for unambiguously specifying a host connected to the network. In the present embodiment, "host 3A" corresponds to the host name for example. The user name 29 is a name for unambiguously specifying a user currently using the host 3 for example. For example, a user name inputted from the operation section 25 when the user logs in the host 3 is stored as the user name 29 in the property 27 of the OS 21.

The printer driver 22 is a print control section based on a function block provided in the host 3 so as to control operations concerning the printing, and is realized by causing a CPU (not shown) to read a program stored in a storage device (not shown).

The printer driver 22 includes a registration section 30, an command section 31, and a property 32. Note that, the property 32 is a property obtaining section for obtaining information by accessing a storage section (not shown), and obtains setting data used by the printer driver 22 and the like. In order to facilitate the description, also the obtained setting data is referred to as the property 32.

The registration section 30 of the present embodiment registers the registration table 17, indicative of the sheet type priority based on the print condition, to the storage section 13 of the printer 2 before commanding the printer 2 to execute the print job, so as to cause the printer 2 to select a print sheet in accordance with the priority corresponding to the print condition.

In more detail, the registration section 30 displays a registration table setting image in the display section (not shown) in accordance with an instruction given by the user to the operation section 25 for example. The image shows conditions obtained by combining selectable print conditions so that one of the sheet type priorities can be selected and set. When an instruction given by the user using the operation section 25 is detected and the registration table is set, the registration section 30 accesses the printer 2 so as to register the registration table 17 to the storage section 13 of the printer 2.

Further, the registration table setting image may include an item, indicative of a combination of the sheet type and the print condition, which functions as prohibition information for prohibiting selection of the sheet type corresponding to the print condition. When the prohibition information is set in this manner, the registration section 30 causes the prohibition information to be included in the registration table 17. Note that, when the server 4 collects registration tables 17 of the printers 2 so as to generate the setting information 46, the prohibition information is used as a prohibition table **46*b* and other information is used as a setting table 46*a*. When a combination of the sheet type and the print condition that prohibit the selection is set, it is possible to easily carry out the user management even in case where many users use the hosts 3**.

The command section 31 transmits the print job via the transmission/reception section 20 after adding the print condition to the print job so that the print condition can be extracted in the printer 2. In order to cause the printer 2 to select a print sheet in accordance with a priority corresponding to the print condition, the print job to be transmitted is made to include at least any one of the host name 28, the user name 29, color information 33, sheet information 34, and an application name 37. The print condition is included in a header part of the inputted print job. Further, data transmitted from the processing section 35 of the application 23 is converted into image data usable in the printer 2, and thus converted image data is included in the print job.

The property 32 includes the color information (color specifying information) 33 and the sheet information 34. The color information 33 is set in printing an image via the printer driver 22, and specifies whether to carry out monochrome printing or to carry out color printing. The sheet information 34 is information for specifying a sheet type in the printing. In case where the sheet feeding tray section 6 of the printer 2 stores no sheet specified by the sheet information 34, other sheet is used in the printer 2 in accordance with a predetermined priority.

The application 23 is a function block indicative of an application program used by the user, and is realized by causing a CPU (not shown) to read and execute a program stored in a storage device (not shown). In the host 3 of the present embodiment, the storage device stores "Write", "Presentation", "Photo", "Text", (not shown) and the like in a readable manner as an example of the application program. Here, out of them, an application, actually executed, whose print job has been generated by the printer driver 22, is referred to as an application 23.

The application 23 includes the processing section 23 and the property 36. The processing section 35 causes the application 23 to carry out data processing and the like. When a printing instruction given by the user is detected by the operation section 25, the processing section 35 transmits desired data 38, stored in the storage section 24, whose image should be printed, to the command section 31. The property 36 is a property obtaining section which accesses a storage section (not shown) and obtains information concerning the application 23. In order to facilitate the description, also the obtained setting data is referred to as the property 36. The property 36 includes an application name (application information) 37.

The storage section 24 is a storage device of the host 3. The storage section 24 stores data 38 used by the processing section 35 of the application 23 for example. The operation section 25 is an operation section which functions as a user interface of the host 3.

Next, the server 4 is described with reference to FIG. 4. The server 4 schematically includes a transmission/reception section 40, a control section 41, a storage section 42, and an operation section 43.

The transmission/reception section 40 is an interface device for transmitting and receiving data of the server 4. The transmission/reception section 40 is constituted of a connector and a buffer (not shown).

The control section 41 of the server 4 is a function block for carrying out an entire process of the server 4, and is realized by causing a CPU (not shown) to read and execute a program stored in a storage device (not shown).

The storage section 42 is a storage device of the server 4. The storage section 42 stores setting information 46 including a setting table 46*a* and a prohibition table 46*b*. The server 4 of the present embodiment has the setting table 42*a* and the prohibition table 46*b* each of which is obtained by changing a priority corresponding to each of print conditions obtained from the printers 2A and 2B into tables. The operation section 43 is an operation section which functions as a user interface of the server 4.

Further, the control section 41 includes a response section 44 and a registration section 45.

The response section 44 responds to an inquiry from the operation control section 15 of the printer 2. The operation control section 15 of the printer 2 uses the print condition, extracted from the print job, so as to make an inquiry concerning a sheet type priority corresponding to the print condition. When the response section 44 receives the inquiry, the response section 44 accesses the storage section 42 and obtains the setting information 46. The response section 44 retrieves the priority in the print condition corresponding to the inquiry, and sends thus obtained priority by return to the printer 2 as an order table.

The registration section 45 is a section by which the sheet type priority for each print condition is registered to the storage section 42. The registration section 45 has a function for detecting the printers 2A and 2B connected via the network N. When the operation section 43 detects a registration instruction given by the user, the registration section 45 sequentially accesses the printers 2A and 2B via the transmission/reception section 40, and sequentially obtains the registration tables 17 registered to the storage sections 13 of the printers 2A and 2B. The registration section 45 causes the storage section 42 to store thus obtained data as the setting information 46 constituted of the setting table 46*a* and the prohibition table 46*b*. In the registration table 17, prohibition information concerning a combination of a sheet type and a print condition that prohibits selection is used as the prohibition table 46*b*. Other data is used as the setting table 46*a*.

Here, each of FIG. 5 and FIG. 6 shows a part of an example of the setting information 46 stored in the storage section 42.

As shown in FIG. 5 and FIG. 6, the setting table 46*a* of the setting information 46 of the present embodiment includes not only an item concerning a sending end printer but also a plurality items such as a user name (user information), a host name (device information), an application name (application information), color specifying information, and the like. The user name is a name of a user who has commanded the printer 2 to execute the print job. The host name is a name for specifying a host by which the printer 2 has been commended to execute the print job. The application name is a name for specifying an application by which the print job has been generated. The color specifying information is information for specifying whether to carry out color printing or to carry out monochrome printing in commanding the printer 2 to execute the print job.

FIG. 5 shows an example of a setting table 46*a* concerning a host 3A and a user X. When not only the sending end printer name but also the user name, the application name, the color specifying information, and the like are specified, it is possible to extract an order table concerning the priority in accordance with the foregoing information. For example, in case where a user X is specified as the user name, and the host 3A is specified as the host name, and "Write" is specified as the application name, and "color" is specified as the color specifying information, in the print job transmitted from the host 3A to the printer 2A, the priority is such that: a primarily prioritized paper is a normal paper, and a secondarily prioritized paper is a recycled paper, and a thirdly prioritized paper is a thin paper, and no paper is specified as a fourthly prioritized paper.

FIG. 6 shows an example of a setting table 46*a* concerning a host 3B and the user X. For example, in case where the user X is specified as the user name, and a host 3B is specified as the host name, and "Write" is specified as the application name, "color" is specified as the color specifying information, in the print job transmitted from the host 3B to the printer 2A, the priority is such that: a primarily prioritized paper is a normal paper, and a secondarily prioritized paper is a recycled paper, and no sheet is specified as a thirdly prioritized paper and a fourthly prioritized paper.

Further, the storage section 42 of the server 4 stores also the prohibition table 46*b*. The prohibition table 46*b* causes a sheet type not to be selected in case where the sheet type corresponds to a predetermined print condition regardless of the order table.

Figures 8, 9:
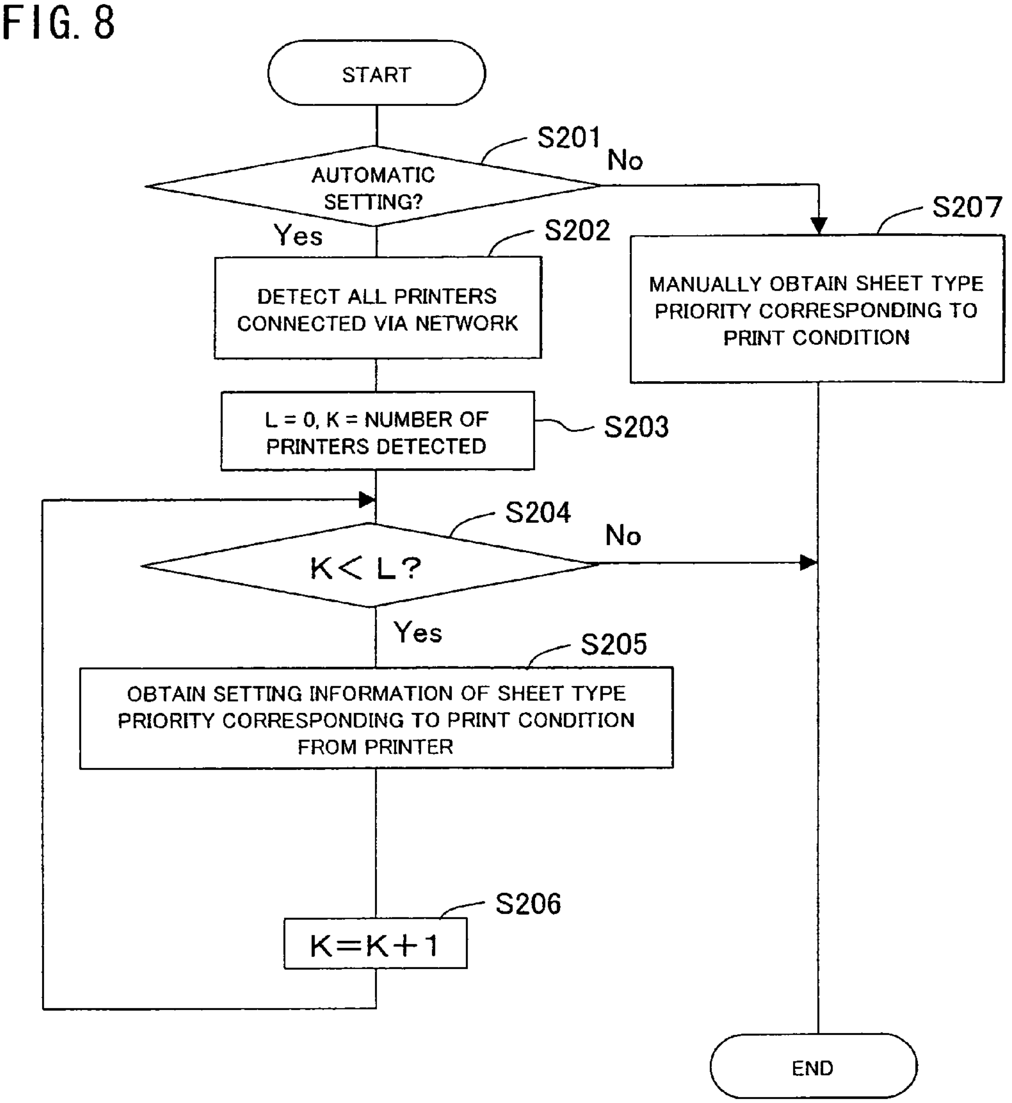
FIG. 8 is a flowchart showing an example of a procedure in the data management device.
FIG. 9 shows an example of a prohibition table stored in the data management device.
Figure 10:
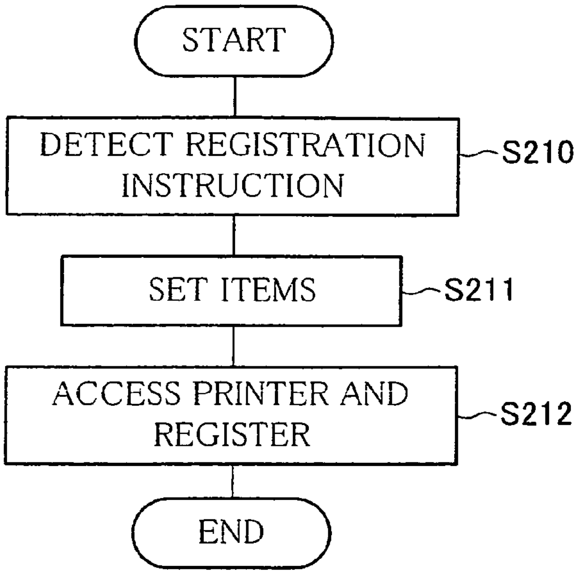
FIG. 10 is a flowchart showing an example of a procedure in the print job transmission device.
Figure 11:
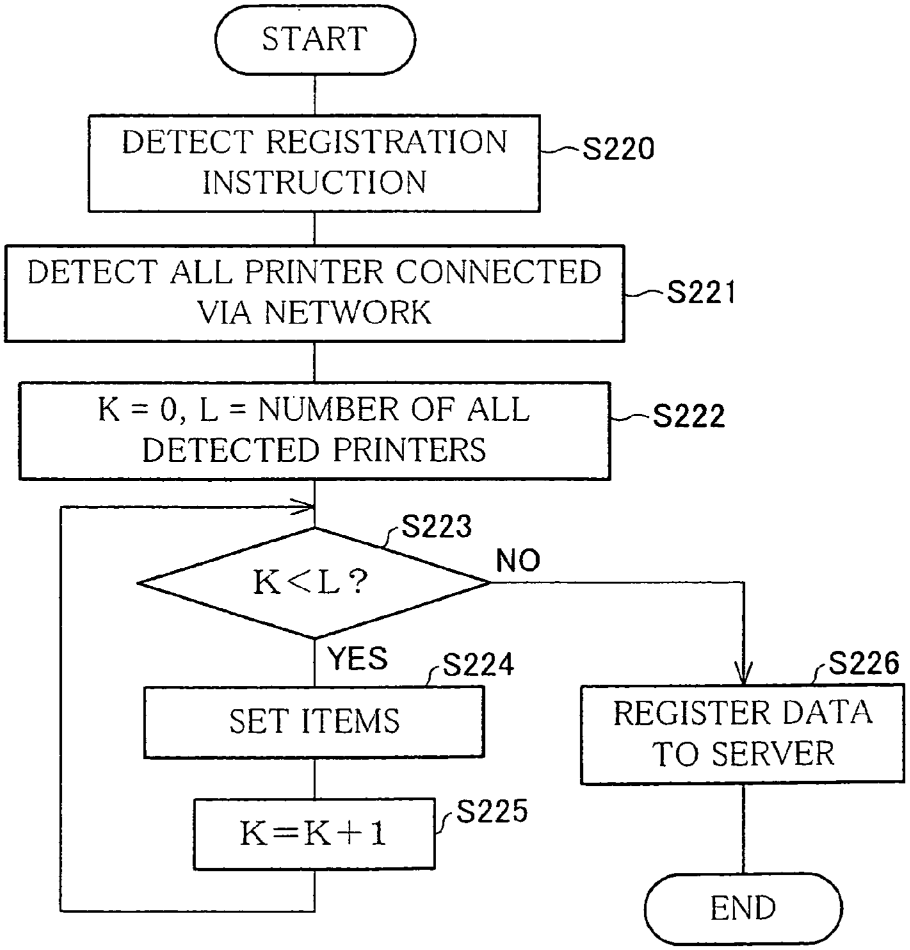
FIG. 11 is a flowchart showing other example of the procedure in the print job transmission device according to the present invention.

FIG. 9 shows an example of the prohibition table 46*b*. The prohibition table 46*b* of the present embodiment includes items such as a host, an application, and color/monochrome.

The item "host" shown in FIG. 9 means that: in case of specifying a priority, it is impossible to cause the host 3C to select a thin paper and a photograph paper and it is impossible to cause the host 3D to select a photograph paper. The item "application" means that: in case of setting a priority, it is impossible to cause any host to select a photograph sheet in printing an image by means of a "Text" application. The item "color/monochrome" means that: in case of setting a priority, it is impossible to select a photograph paper in setting the monochrome printing no matter what combination of a host and an application may be used. Note that, an item showing no description means that there is no prohibition.

According to the prohibition table 46*b*, it is possible to easily carry out management by appropriately determining a prohibition item even in case of managing print conditions of many users.

The following description explains a case of printing an image by using the devices of the print system 1 described above. In the print system 1 of the present embodiment, a priority corresponding to a print condition is registered in advance before commanding the printer 2 to execute the print job. In more detail, registration tables are registered from the host 3 to the printers 2A and 2B. The registration procedure is described as follows with reference to FIG. 10.

In S210, the operation section 25 of the host 3 detects a registration instruction given by the user. In S211, the host 3 causes the registration section 30 to display a registration table setting image in a display section (not shown) or to perform a similar operation so as to detect the user instruction by means of the operation section 25, and temporarily stores the setting concerning the items of the registration table. In S212, the registration section 30 collectively transmits thus set items to the printer 2 as the registration table, and causes the storage section 13 to store the items as a registration table 17.

As described above, in the host 3, the printer driver 22 performs the foregoing procedure in the setting at the time of using the printers 2A and 2B for example, so that the registration table 17 is registered to each of the printers 2A and 2B. Note that, data registered as the registration table includes a user name as the print condition, so that the setting is carried out for each user. However, the present invention is not limited to the arrangement. For example, the setting can be shared by all the users. Further, for example, a plurality of user names included in a predetermined group are simultaneously specified, so that it is possible to carry out the setting for each group.

Next, data movement from the printer 2 to the server 4 is described as follows with reference to FIG. 8. FIG. 8 is a flowchart showing operations performed on the side of the server 4.

In S201, the registration section 45 of the server 4 determines whether an automatic setting mode for sequentially accessing respective printers so as to obtain setting information with respect to the data movement to the server 4 has been set or not. In the present embodiment, it is determined that the print system 1 is not in the automatic setting mode in case where the setting information 46 has already been stored in the storage section 42 of the server 4. It is determined that the print system 1 is in the automatic setting mode in case where the setting information 46 has not been stored in the storage section 42 yet.

In S201, when the print system 1 is not in the automatic setting mode, the step proceeds to S207, and a priority corresponding to each print condition is manually obtained by accessing the printer 2 as required. In this case, when a printer 2 to be accessed is selected by the operation section 43, the registration section 45 accesses the printer 2, and compares a date on which the registration table 17 of the storage section 13 of the printer 2 was updated with a date on which the setting information 46 of the storage section 42 was updated, and displays thus obtained comparison result in a display section (not shown). When the operation section 43 detects an instruction given by the user to obtain a registration table in accordance with the comparison result, the registration section 45 accesses the printer 2 and obtains the registration table 17, and updates the setting information of the storage section 42. When it is not necessary to update the setting information 46 in S207, the process is ended.

While, in case where it is determined that the print system 1 is in the automatic setting mode in S201, the step proceeds to S202, and the registration section 45 detects the printers 2A and 2B connected to the network N.

In S203, the number of all the printers that have been detected is substituted for a counter value L, and a counter value (printer value) K is set to be 0. In accordance with the printer value, the detected printers 2A and 2B are unambiguously specified. In the print system 1 arranged as shown in FIG. 2 for example, the printer 2A is indicated by K=0, and the printer 2B is indicated by K=1, and the counter value L is indicated by L=2.

In S204, it is determined whether the counter value K is less than the counter value L or not, the process is ended in case where the counter value K is not less than the counter value L. In case where the counter value K is less than the counter value L, the step proceeds to S205, and the registration section 45 accesses the K-th printer, and obtains the registration table 17 stored in the storage section 13 of the printer 2. In S206, the counter value K is set to be K+1, and the step returns to S204.

By performing the foregoing process, it is possible to store the setting information 46 concerning the printer 2 in the storage section 42 of the server 4 which functions as a data management device. Thereafter, in case where the server 4 receives an inquiry concerning data from the printer 2, the response section 44 of the server 4 responds with reference to data of the storage section 42 as described above.

Figure 7:
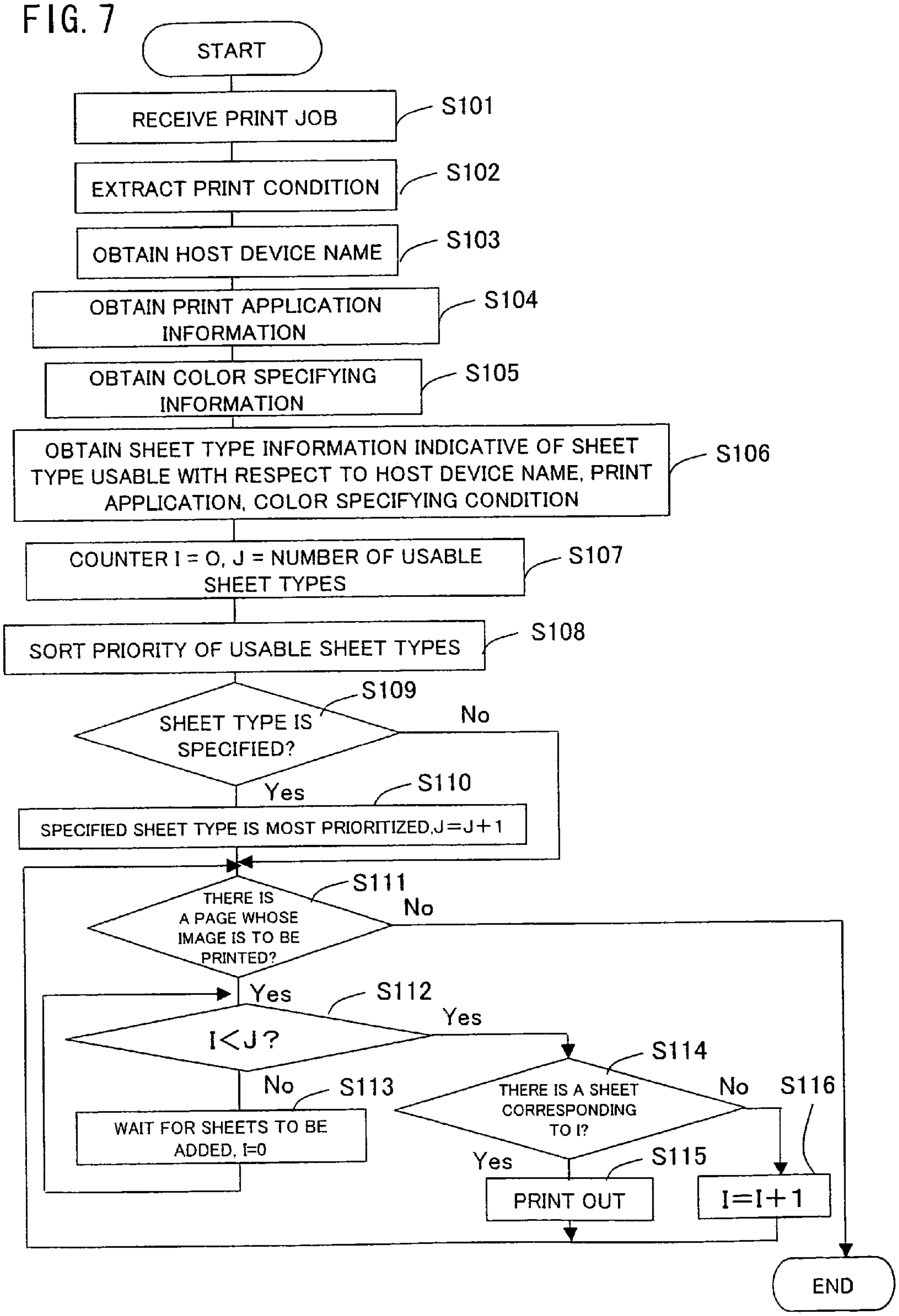
FIG. 7 is a flowchart showing an example of a procedure in the image forming device.

Next, the following description explains operations of the printer 2 at the time of printing with reference to a flowchart of FIG. 7. The printer 2 of the present embodiment selects a most appropriate sheet in accordance with a priority after detecting whether each of the trays 6-1 to 6-n of the sheet feeding tray section 6 has a sheet or not for each page whose image is to be printed.

In more detail, the printer 2 is arranged so that the transmission/reception section 10 receives a print job transmitted from the host 3 in S101. The print job includes a print condition as a header and image data as data whose image should be printed.

In S102, the operation control section 15 of the printer 2 extracts the print condition, which functions as a header, from the print job. The operation control section 15 obtains a host device name (host name) from thus extracted print condition (S103), and obtains a name of an application by which image data has been generated (S104), and obtains color specifying information (color) (S105).

Next, in S106, the operation control section 15 uses the host device name, the application name, and the color specifying information that have been obtained, so as to obtain an order table corresponding to the print condition. In the present embodiment, the order table is obtained by making inquiry to the server 4.

In more detail, the operation control section 15 transmits the inquiry, whose data content is the extracted print condition, from the transmission/reception section 10 of the printer 2 via the network N to the server 4. In the server 4 which has received the inquiry by the transmission/reception section 40, the response section 44 of the control section 41 analyses the inquiry and reads the setting information 46 of the storage section 42. The response section 44 extracts an order table, which is a priority included in the print condition, from the setting table 46*a* of the setting information 46, in accordance with the print condition included in the inquiry. Further, in case where an item corresponding to the print condition is included in the prohibition table 46*b* of the setting information 46, the item is extracted and is added to the order table. The response section 44 transmits the order table from the transmission/reception section 10 via the network N to the printer 2. In the printer 2, the transmission/reception section 10 receives the order table from the server 4, and transmits the order table to the operation control section 15. The operation control section 15 converts thus obtained order table into data concerning the trays 6-1 to 6-n by using the tray-sheet relation 16, and transmits the data to the tray selection section 14.

In S107, the tray selection section 14 extracts the number of usable sheet types from the obtained order table, and substitutes the value for a counter value J. Further, a counter value (order value) I for counting the number of sheet types is set to be 0. In S108, the tray selection section 14 extracts a type of a most prioritized sheet from the order table.

In S109, the tray selection section 14 determines whether the sheet type of the print condition corresponds to a specific sheet or not. In case where the sheet type does not correspond to a specific sheet, it is determined that this is in a so-called automatic specifying condition, and the step proceeds to S111.

While, in case where the sheet type is specified in S109, the step proceeds to S110, and sets the specified sheet type to be most prioritized in the order table. Further, in case where the sheet type is not included in the order table, the counter value J is changed to J+1. After the step S110, the step proceeds to S111. Here, “the specified sheet type is set to be most prioritized” means the following procedure. That is, for example, in case where three sheets are respectively set to be primarily, secondarily, and thirdly prioritized, when a type of the secondarily prioritized sheet is specified in the print condition, the secondarily prioritized sheet is changed to a primarily prioritized sheet and the foregoing primarily prioritized sheet is changed to a secondarily prioritized sheet. In this manner, the specified sheet is changed to the primarily prioritized sheet and each of sheets which have been more prioritized than the specified sheet is made less prioritized by a single rank.

In S111, the operation control section 15 determines whether or not there is data whose image has not been printed out of the print data, that is, the operation control section 15 determines whether or not there is data whose image for a next page should be printed. In case where there is the data whose image should be printed, the operation control section 15 outputs the print data corresponding to the single page to the printer engine 7, and notifies the tray selection section 14 that there is the print data, and the step proceeds to S112. In case where there is no data whose image should be printed in S111, the process is ended.

In S112, the tray selection section 14 determines whether I<J is satisfied or not concerning the counter values I and J. In case where this condition is not satisfied, this means that all the specified sheets run out. In this case, the step proceeds to S113, and the counter value I is set to be I=0, and the print system 1 waits for the user to add sheets to the printer 2. When the sheets are added, the step returns from S113 to S112.

While, in S114 in case where I<J is satisfied in S112, the tray selection section 14 determines whether a tray corresponding to the counter value I which functions as an order value has any sheets or not. A relationship between the counter value I and the tray is as follows: for example, I=0 corresponds to the tray 6-1, and I=n−1 corresponds to the tray 6-n. The tray selection section 14 carries out the determination by checking a signal transmitted from the tray detection section 9. In case where there are corresponding sheets in a tray of the sheet feeding tray section 6, the step proceeds to S116 so as to carry out the printing, and then the step returns to S111. While, in case where there are no corresponding sheet in S114, the step proceeds to S116 so as to change the counter value I which functions as an order value to I+1, and then the step returns to S111.

According to the foregoing procedure, when the printer 2 receives the print job whose print condition has been set, the printer 2 selects a sheet type in accordance with a sheet type priority corresponding to the print condition, and prints an image thereon.

As described above, the present invention relates to (i) an image forming device, provided with a plurality of sheet trays, which can print an image on a desired sheet by selecting one of the sheet trays, (ii) a host device which can communicate with the image forming device, (iii) a data management device, and (iv) a program for realizing the devices. According to the present invention, a sheet type priority for each print condition is set, so that it is possible to record an image on a sheet desired by the user. While, a conventional arrangement selects a sheet regardless of the print condition, so that an image may be recorded on a sheet which is not desired by the user.

Note that, the printer 2 described in the foregoing embodiment may be a multi-functional device having a copy function and a facsimile function.

Further, the foregoing description explained the arrangement in which the host 3 and the server 4 are separately provided, but the present invention is not limited to this arrangement. One of the hosts 3 may function also as the server 4, or the server 4 may function also as one of the hosts 3, or the printer 2 may function also as either the host 3 or the server 4.

Note that, the foregoing description explained the arrangement in which the registration section 30 of the host 3 displays the registration table setting image at the time of registration from the host 3 to the printer 2, but the present invention is not limited to this arrangement. For example, it may be so arranged that: the control section 11 of the printer 2 has a registration reception section (not shown), and the registration reception section causes the host 3 to display the registration table setting image in response to access from the host 3. The registration reception section may be a Web server. Further, for example, it is possible to input the registration table directly to the printer 2 by using not the host 3 but the display operation section 12 of the printer 2.

Further, the foregoing embodiment explained the arrangement in which the printer 2 makes an inquiry to the server 4 in accordance with the received print job, but the present invention is not limited to the arrangement. It may be so arranged that: the operation control section of the printer 2 accesses the storage section 13, and extracts an order table from the registration table 17 of the storage section 13.

Further, the foregoing embodiment explained the arrangement in which the host 3 registers data to the printer 2, but the data registration with respect to the printer 2 is not limited to the arrangement. It may be so arranged that: the printer 2 accesses the host 3 or a data management device such as the server 4 and obtains the registration table, and stores the registration table as the registration table 17 of the storage section 13.

Further, the foregoing embodiment explained the arrangement in which the registration section 30 of the host 3 temporarily accesses the printer 2 and registers the registration table, but the present invention is not limited to the arrangement. It may be so arranged that the registration section 30 of the host 3 directly accesses the server 4 and registers the registration table. The procedure in which the host 3 directly accesses the server 4 in this manner is described as follows with reference to FIG. 11.

In S220, the operation section 25 of the host 3 detects a registration instruction given by the user. In S221, the registration 30 of the host 3 detects the printers 2A and 2B connected to the network N.

In S222, the number of all the detected printers is substituted for the counter value L, and the counter value (printer value) K is set to be 0.

In S223, whether the counter value K is less than the counter value L or not is determined. In S224 in case where the counter value K is less than the counter value L in S223, the operation section 25 detects items set by the user concerning a printer corresponding to the printer value K, and the registration section 30 retains contents of the items, and the step proceeds to S225. In S225, the counter value K is changed to K+1, and the step returns to S223. In case where the counter value K is not less than the counter value L in S223, the step proceeds to S226, and the registration section 30 registers data of the respective printers to the server 4.

By performing the foregoing procedure, it is possible to directly register the setting information 46 from the host 3 to the server 4.

Further, in a manner adverse to the foregoing procedure, it may be so arranged that: the server 4 directly accesses the host 3 and obtains data, and registers thus obtained data to the storage section 42 of the server 4.

Further, the host name, the user name, the application name, and the color specifying information, that were described in the foregoing embodiment as the print conditions are merely examples. The print conditions are not limited to them. As the print condition, print image quality information, print target data grayscale number information, or the like may be included. Further, in case where a user is determined for each host for example, either the host name or the user name is included in the print condition.

Further, the number of the printers 2 and the hosts 3 in the print system 1 are not limited to the arrangement of the foregoing embodiment. There is no limit in the number of printers 2 and hosts 3.

Further, in the foregoing embodiment, the operation control section 15 extracts the print condition from the print job inputted to the transmission/reception section 10 via the network N. However, in case where the printer 2 functions as a copying machine and the printer 2 receives and carries out the print job that has been generated in the printer 2, the operation control section 15 may extract a print condition from the print job which includes data concerning the print condition. Further, in case where the printer 2 functions as a copying machine and includes an operation section by which the user specifies the print condition, the operation control section 15 may receive the print condition from the operation section. In this case, color specifying information and the like are used as the print condition.

Further, the foregoing embodiment described such an arrangement that: the operation control section 15 receives the setting information 46 indicative of a sheet type priority corresponding to the print condition stored in the storage section 42 of the server 4 or receives the order table indicative of a priority based on the print condition from the registration table 17 of the storage section 16. However, any arrangement is possible as long as a plurality of order tables each predefining a priority of sheets to be used exist in any section and the operation control section 15 selects an order table corresponding to the print condition from these order tables.

The aforementioned specific embodiments or examples merely clarify the technical contents of the present invention, and the present invention is not limited to them, and may be varied in many ways within a scope of the following claims. Embodiments obtained by combining technical means disclosed in different embodiments as required are included in the technical scope of the invention.

As described above, the image forming device according to the present invention includes: a transmission/reception section which functions as an interface to a network; a control section for generating a tray selection signal in accordance with a print job inputted to the transmission/reception section, and the print job includes a print condition indicative of a condition for printing; and a sheet feeding tray section, having a plurality of sheet trays storing sheets therein, which supplies a sheet from one of the sheet trays that has been selected in accordance with the tray selection signal transmitted from the control section, wherein the control section includes: an operation control section for extracting the print condition from the print job and for accessing a data management device, whose connection to the operation control section via the network is allowed by the transmission/reception section, and for obtaining an order table, indicative of a priority based on the print condition that has been extracted, from setting information, indicative of a sheet type priority corresponding to the print condition stored in a first storage section of the data management device; and a tray selection section for generating the tray selection signal for selecting one of the sheet trays, in accordance with the order table transmitted from the operation control section.

When the image forming device receives the print job via the transmission/reception section, the control section generates the tray selection signal, and the image forming device supplies a print sheet from a sheet tray that has been selected from the sheet feeding tray section in accordance with the tray selection signal.

In more detail, the image forming device has the following characteristics. That is, the control section of the image forming device includes the operation control section for extracting the print condition included in the print job and for obtaining the sheet type priority corresponding to the print condition from the data management device connected to the operation control section via a network.

Here, the print condition is a condition for printing, and examples of the print condition include: device information indicative of a print job transmission device that has transmitted the print job; user information indicative of a user who has used the print job transmission device; application information indicative of an application which allowed data whose image should be printed in the print job to be generated; color specifying information for specifying color printing or monochrome printing; and sheet information for specifying a type of a sheet used in printing. The print condition is not limited to a specific condition.

In the data management device connected to the image forming device, the priority corresponding to the print condition is stored in the first storage section in advance as the setting information. The data management device extracts the priority corresponding to the desired print condition included in the print job in response to the access from the image forming device, and sends the priority by return to the image forming device.

Further, the control section of the image forming device includes the tray selection section for receiving the priority that has been sent by return from the operation control section as the order table and for generating the tray selection signal in accordance with the order table.

Thus, when the image forming device receives the print job via the transmission/reception section, the image forming device selects a sheet in accordance with the priority based on the print condition specified in the print job. According to the arrangement, it is possible to set the sheet type priority corresponding to the print condition, so that it is possible to record an image on a sheet desired by a user. Thus, it is possible to surely select an appropriate sheet.

Note that, it can be said that: the image forming device includes a plurality of sheet trays, and selects a sheet in accordance with a sheet type specified in each of print jobs respectively received from a plurality of print job transmission devices, wherein the image forming device includes: print condition obtaining means for obtaining a print condition other than the sheet type specified in the print job; setting means for setting a sheet type priority corresponding to the print condition; and selection means for selecting a sheet in accordance with the priority set by the setting means when sheets that have been specified run out or when any sheet may be selected regardless of the sheet type.

The image forming device according to the present invention includes: a transmission/reception section which functions as an interface to a network; a control section for generating a tray selection signal in accordance with a print job inputted to the transmission/reception section, and the print job includes a print condition indicative of a condition for printing; and a sheet feeding tray section, having a plurality of sheet trays storing sheets therein, which supplies a sheet from one of the sheet trays that has been selected in accordance with the tray selection signal transmitted from the control section, wherein the image forming device further includes a second storage section for storing a registration table as the setting information indicative of the sheet type priority corresponding to the print condition, and the registration table is setting information for specifying a main body of the image forming device, and the control section includes: the operation control section for extracting the print condition from the print job and accesses the second storage section so as to obtain an order table, indicative of a priority based on the print condition that has been extracted, from the registration table of the second storage section; and a tray selection section for generating the tray selection signal for selecting one of the sheet trays, in accordance with the order table transmitted from the operation control section.

When the image forming device receives the print job via the transmission/reception section, the control section generates the tray selection signal in accordance with the print job, and supplies a print sheet from a sheet tray selected from the sheet feeding tray section in accordance with the tray selection signal.

In more detail, the image forming device has the following characteristics. That is, the control section of the image forming device includes the operation control section for extracting the print condition included in the print job and for obtaining the sheet type priority corresponding to the print condition from the registration table stored in the second storage section.

Here, the print condition is a condition for printing, and examples of the print condition include: device information indicative of a print job transmission device that has transmitted the print job; user information indicative of a user who has used the print job transmission device; application information indicative of an application which allowed data whose image should be printed in the print job to be generated; color specifying information for specifying color printing or monochrome printing; and sheet information for specifying a type of a sheet used in printing. The print condition is not limited to a specific condition. Further, a sheet which is different in terms of either a material or a thickness is regarded as a "different sheet", and a sheet having the same material and the same thickness is regarded as a "same sheet".

Further, the image forming device includes the second storage section which stores the registration table for specifying the image forming device as the setting information indicative of a sheet type priority corresponding to the print condition.

Further, the control section of the image forming device includes the tray selection section for receiving the priority that has been sent by return from the operation control section as the order table and for generating the tray selection signal in accordance with the order table.

Thus, when the image forming device receives the print job via the transmission/reception section, the image forming device selects a sheet in accordance with the print condition specified in the print job. According to the arrangement, it is possible to set the sheet type priority corresponding to the print condition, so that it is possible to record an image on a sheet desired by a user. Thus, it is possible to surely select an appropriate sheet.

Further, according to the arrangement, it is not necessary to access the data management device connected via a network for example, so that it is possible to more quickly select an appropriate sheet tray and to print an image on a sheet supplied from thus selected sheet tray.

Further, the image forming device may be arranged so that: in case where the print condition includes sheet information for specifying a sheet type, the operation control section prioritizes the sheet type most in the order table.

The image forming device according to the present invention is arranged so that: the operation control section accesses a data management device, whose connection to the operation control section via the network is allowed by the transmission/reception section, and obtains an order table, indicative of a priority based on the print condition that has been extracted, from setting information, indicative of a sheet type priority corresponding to a print condition stored in a first storage section of the data management device, and registers the registration table to the second storage section.

According to the arrangement, the operation control section accesses the data management device and registers the registration table to the second storage section in advance, so that it is possible to surely realize the image forming device.

Further, the operation control section accesses the other device and registers the registration table, so that it is not necessary to provide a setting panel on the image forming device.

Note that, in specifying the data management device to be accessed, the operation control section may perform the detection via the network, or the data management device may detect an instruction given by the user.

Further, it can be said that: the image forming device includes sheet type priority information obtaining means for obtaining sheet type priority information corresponding to the print condition from a predetermined data management device which is capable of communicating with the image forming device.

The image forming device according to the present invention is arranged so that: the print condition includes at least either device information concerning a print job transmission device, whose connection to the main body of the image forming device via the network is allowed by the transmission/reception section, or user information concerning a user who has given a command instruction to execute the print job with the print job transmission device.

According to the arrangement, the print condition includes either the device information or the user information, so that it is possible to supply sheets in accordance with an appropriate priority so as to correspond to a print job transmission device that has transmitted the print job or a user who has used the device. That is, it is possible to record an image on a sheet desired by each user.

The image forming device according to the present invention is arranged so that: the print condition includes application information concerning an application by which image data included in the print job is generated in the print job transmission device, whose connection to the main body of the image forming device via the network is allowed by the transmission/reception section, said print job transmission device having transmitted the print job to the transmission/reception section.

According to the arrangement, the print condition includes the application information, so that it is possible to record an image on a sheet desired by a user so as to correspond to each application. For example, in case of using an application for processing image data that has been taken by a digital camera, a photograph paper is used as the print sheet, and in case of using an application for generating text data, a recycled paper is used as the print sheet.

The image forming device according to the present invention is arranged so that: the print condition includes color specifying information in printing an image in accordance with the print job.

According to the arrangement, the print condition includes the color specifying information, so that it is possible to record an image on a sheet desired by a user so as to correspond to each color specifying information. Here, the color specifying information is information for specifying color printing or monochrome printing. For example, in case of printing an image based on color image data, a photograph paper is used as a print sheet, and in case of printing an image based on monochrome text data, a recycled paper is used as a print sheet.

The image forming device according to the present invention is arranged so that: the setting information includes a prohibition table concerning such a combination of a print condition and a sheet type that selection of the combination is prohibited, and the operation control section obtains the order table and the prohibition table from the setting information, and the tray selection section generates the tray selection signal in accordance with the order table and the prohibition table that have been transmitted from the operation control section while excluding a condition indicated by the prohibition table.

According to the arrangement, it is possible to prevent a condition indicated in the prohibition table from being selected, so that it is possible to prevent an image from being recorded on a sheet that is not desired by a user. Further, this arrangement facilitates management so as to correspond to each user and each printer.

Note that, it can be said that: the image forming device includes means for limiting a sheet type which can be selected in accordance with the print condition.

The print condition transmission device according to the present invention includes: a transmission/reception section which functions as an interface to a network; and a print control section for commanding an image forming device, whose connection to the print control section via the network is allowed by the transmission/reception section, to execute a print job including a print condition indicative of a condition for printing, wherein the print control section includes a registration section for registering a registration table, indicative of a sheet type priority corresponding to the print condition concerning the image forming device, to a second storage section of the image forming device before commanding the image forming device to execute the print job, so as to cause the image forming device to obtain an order table, indicative of a priority based on the print condition included in the print job, from the registration table in accordance with the print condition included in the print job which the image forming device has been commanded to execute.

The print control section of the print job transmission device transmits the print job to the image forming device whose connection to the print job transmission device via the network is allowed by the transmission/reception section, thereby printing an image on a sheet.

Here, in case where the print job transmitted by the print job transmission device includes a predetermined print condition, the image forming device obtains a priority, corresponding to the print condition extracted from the print job, from the second storage section, and selects a sheet in accordance with the priority, so as to print an image on the selected sheet.

According to the arrangement, the print job transmission device registers the registration table for obtaining the priority into the second storage section of the image forming device in advance, so that it is possible to cause the image forming device to surely obtain the order table.

Further, it is possible to select a sheet in accordance with the print condition by combining the print job transmission device with the image forming device.

The print job transmission device according to the present invention includes: a transmission/reception section which functions as an interface to a network; and a print control section for commanding an image forming device, whose connection to the print control section via the network is allowed by the transmission/reception section, to execute a print job including a print condition indicative of a condition for printing, wherein the print control section includes a registration section for registering setting information, indicative of a sheet type priority corresponding to the print condition, to a first storage section of a data management device whose connection to the print control section via the network is allowed by the transmission/reception section, before commanding the image forming device to execute the print job, so as to cause the image forming device to obtain an order table, indicative of a priority based on the print condition included in the print job which the image forming device has been commanded to execute, from the first storage section of the data management device, in accordance with the setting information and the print condition included in the print job.

The print control section of the print job transmission device transmits the print job to the image forming device whose connection to the print condition transmission device via the network is allowed by the transmission/reception section, so as to cause the image forming device to print an image on a sheet.

Here, in case where the print job transmitted by the print job transmission device includes a predetermined print condition, the image forming device obtains a priority, corresponding to the print condition extracted from the print job, from the first storage section whose connection to the print job transmission device via the network is allowed by the transmission/reception section, and selects a sheet in accordance with the priority, so as to print an image on the selected sheet.

According to the arrangement, the print job transmission device registers the registration table for obtaining the priority into the first storage section of the data management device in advance, so that it is possible to cause the image forming device to access the data management device and to surely obtain the order table.

Further, it is possible to select a sheet in accordance with the print condition by combining the job transmission device with the image forming device and the data management device.

The print job transmission device according to the present invention includes: a transmission/reception section which functions as an interface to a network; and a print control section for commanding an image forming device, whose connection to the print control section via the network is allowed by the transmission/reception section, to execute a print job including a print condition indicative of a condition for printing, wherein the print control section includes a command section for adding the print condition having at least any one of (i) device information concerning a main body of the print job transmission device, (ii) user information concerning a user who has given a command instruction to execute the print job by using the main body of the print job transmission device, (iii) application information concerning an application by which image data included in the print job is generated in the main body of the print job transmission device, and (iv) color specifying information in printing an image on the basis of the print job, to the print job so that the print information is extractable, so as to cause the image forming device, which has been commanded to execute the print job, to select a sheet type in accordance with a priority corresponding to the print condition included in the print job.

The print control section of the print job transmission device transmits the print job to the image forming device whose connection to the print job transmission device via the network is allowed by the transmission/reception section, and causes the image forming device to print an image on a sheet.

Here, the print job transmission device causes at least one of the device information, the user information, the application information, and the color specifying information, to be included in the print condition transmitted by the print job transmission device. Thus, it is possible to appropriately select a different sheet type so as to correspond to at least one of (i) a device by which the image forming device has been commanded to execute the print job, (ii) a user who has given the command, (iii) an application by which image data of the print job has been generated, and (iv) color specifying information.

The data management device according to the present invention includes a transmission/reception section which functions as an interface to a network, whose connection to an image forming device via the network is allowed by the transmission/reception section, and the data management device includes: a first storage section for storing setting information indicative of a sheet type priority corresponding to a print condition, indicative of a condition for printing, which is included in a print job which the image forming device is commanded to execute; and a control section for managing the setting information, wherein the control section includes a registration section for accessing the image forming device and obtaining a registration table, indicative of the setting information concerning the image forming device, from a second storage section of the image forming device, so as to register the registration table to the first storage section.

The data management device accesses the image forming device, and obtains the registration table indicative of the setting information concerning the image forming device, and registers the setting information into the first storage section. Thus, it is possible to store the setting information, indicative of a sheet type priority corresponding to the print condition, in the first storage section. Thus, in case where an inquiry for specifying the print condition is made by the image forming device, the setting information stored in the first storage section is referred to, and a priority concerning the print condition is obtained, thereby sending the print condition by return to the image forming device. Thus, it is possible to cause the image forming device to select a sheet type based on the priority and to print an image on the selected sheet.

Further, when the data management device accesses each image forming device connected to the network and obtains the registration table, it is possible to cause the data management device to collectively manage information.

The data management device according to the present invention includes a transmission/reception section which functions as an interface to a network, whose connection to an image forming device via the network is allowed by the transmission/reception section, and the data management device includes: a first storage section for storing setting information indicative of a sheet type priority corresponding to a print condition, indicative of a condition for printing, which is included in a print job which the image forming device is commanded to execute; and a control section for managing the setting information, wherein the control section includes a registration section for accessing a print job transmission device which commands the image forming device to execute the print job and for obtaining the setting information from a third storage section of the print job transmission device, so as to register the setting information to the first storage section.

The data management device accesses the print job transmission device, and obtains the setting information, and registers the setting information to the first storage section. Thus, it is possible to store the setting information, indicative of a sheet type priority corresponding to the print condition, in the first storage section. Thus, in case where an inquiry for specifying the print condition is made by the image forming device, the setting information stored in the first storage sectiontion is referred to, and a priority concerning the print condition is obtained, thereby sending the print condition by return to the image forming device. Thus, it is possible to cause the image forming device to select a sheet type based on the priority and to print an image on the selected sheet. Further, it is possible to cause the data management device to collectively manage information.

The data management device according to the present invention includes a transmission/reception section which functions as an interface to a network, whose connection to an image forming device via the network is allowed by the transmission/reception section, and the data management device includes: a first storage section for storing setting information indicative of a sheet type priority corresponding to a print condition, indicative of a condition for printing, which is included in a print job which the image forming device is commanded to execute; and a control section for managing the setting information, wherein the control section includes a response section for obtaining an order table, indicative of a priority based on the print condition, from the setting information of the first storage section, in response to an inquiry, made by the image forming device, which specifies the print condition, so as to send the order table by return to the image forming device.

In case where an inquiry for specifying the print condition is made by the image forming device, the data management device refers to the setting information stored in the first storage section, and obtains a priority concerning the print condition, thereby sending the print condition by return to the image forming device. Thus, it is possible to cause the image forming device to select a sheet type based on the priority and to print an image on the selected sheet. Further, it is possible to cause the data management device to collectively manage information.

Note that, it can be said that: the data management device is capable of communicating with an image forming device which includes a plurality of sheet trays, and selects a sheet in accordance with a sheet type specified in each of print jobs respectively received from a plurality of print job transmission devices, so as to form an image, wherein the data management device includes: setting means for setting sheet type priority information corresponding to the print condition of the image forming device; and means for transmitting the sheet type priority information corresponding to the print condition to the image forming device.

The program according to the present invention causes a computer to function as a print job transmission device provided with any one of the foregoing print control sections.

When the program is carried out in a computer having a storage section, it is possible to realize the foregoing print job transmission device.

The program according to the present invention causes a computer to function as a data management device provided with any one of the foregoing control sections.

When the program is carried out in a computer having a storage section, it is possible to realize the foregoing data management device.

Further, it can be said that: the program is a data management program which is capable of communicating with an image forming device which includes a plurality of sheet trays, and selects a sheet in accordance with a sheet type specified in each of print jobs respectively received from a plurality of print job transmission devices, so as to form an image, wherein the data management program includes: a setting procedure for setting sheet type priority information corresponding to the print condition of the image forming device; and a procedure for transmitting the sheet type priority information corresponding to the print condition to the image forming device.

The storage medium according to the present invention is a computer-readable storage medium which stores any one of the foregoing programs.

When the program of the storage medium is read by a computer having a storage section and is carried out, it is possible to realize the print job transmission device or the data management device.

The method according to the present invention for supplying a print sheet from a sheet tray selected from a plurality of sheet trays for storing print sheets therein, said method comprising the steps of: obtaining an order table indicative of a priority based on a desired print condition from setting information, indicative of a sheet type priority corresponding to a print condition, that is stored in a storage section; and selecting a sheet tray from the plurality of sheet trays in accordance with the order table so as to supply the print sheet from the sheet tray that has been selected.

The image forming device which carries out the foregoing method selects a single sheet tray in accordance with the order table indicative of a priority based on the print condition, and supplies a print sheet from thus selected sheet tray. Further, it may be so arranged that: whether any sheet is stacked on the sheet tray or not is determined every time an image is printed on a sheet, and a single sheet tray is selected in accordance with the order table.

According to the arrangement, it is possible to select a print sheet in accordance with the desired priority corresponding to the print condition and to print an image on the selected sheet.

Note that, the storage section arranged in the foregoing manner may be a storage section (second storage section) of the image forming device, or may be a storage section (first storage section) of the data management device connected to the image forming device via a network, or may be a storage section (third storage section) of the print job transmission device.

Further, the step of obtaining the order table from the setting information stored in the storage section may be carried out by the image forming device, or may be carried out by the foregoing data management device or the print job transmission device.

For example, it may be so arranged that: the print job transmission device extracts the desired order table by using the print condition that has been set concerning the print job, and causes the order table to be included in the print job, and transmits the print job to the image forming device. The image forming device obtains the order table from the print job, and carries out the foregoing method.

Further, the image forming device which carries out the foregoing method is not limited to a printer which receives the print job via a network and prints an image, but the image forming device may be a device which functions as a copying machine.

By using the aforementioned prohibition table, the image forming device according to the present invention facilitates print management for each print job transmission device and for each user also in a print system, having a plurality of print job transmission devices, which are accessed by a large number of users.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image forming device, comprising:

a transmission/reception section which functions as an interface to a network;

a control section for generating a tray selection signal in accordance with a print job inputted to the transmission/reception section, said print job including a print condition indicative of a condition for printing; and a sheet feeding tray section, having a plurality of sheet trays capable of storing sheets of different types therein, which supplies a sheet from one of the sheet trays that has been selected in accordance with the tray selection signal transmitted from the control section, wherein said control section includes:

an operation control section for extracting the print condition from the print job and for obtaining an order table, indicative of a priority based on the print condition that has been extracted, from setting information, indicative of a sheet type priority indicating a type of paper corresponding to the print condition, wherein the order table specifies one of the sheet trays; and a tray selection section for generating the tray selection signal for selecting one of the sheet trays, in accordance with the order table transmitted from the operation control section.

2. The image forming device as set forth in claim 1, wherein the operation control section extracts the print condition from the print job and accesses a data management device, whose connection to the operation control section via the network is allowed by the transmission/reception section, so as to obtain an order table, indicative of a priority based on the print condition that has been extracted, from setting information, indicative of a sheet type priority corresponding to a print condition stored in a first storage section of the data management device.

3. The image forming device as set forth in claim 2, further comprising a second storage section for storing a registration table as the setting information indicative of the sheet type priority corresponding to the print condition, said registration table being setting information for specifying a main body of the image forming device, wherein the operation control section extracts the print condition from the print job and accesses the second storage section so as to obtain an order table, indicative of a priority based on the print condition that has been extracted, from the registration table of the second storage section.

4. The image forming device as set forth in claim 3, wherein the operation control section accesses a data management device, whose connection to the operation control section via the network is allowed by the transmission/reception section, and obtains the registration table, concerning the main body of the image forming device, from the setting information indicative of the sheet type priority corresponding to the print condition stored in the first storage section of the data management device, and registers the registration table to the second storage section.

5. The image forming device as set forth in claim 1, wherein the print condition includes at least either device information concerning a print job transmission device, whose connection to the main body of the image forming device via the network is allowed by the transmission/reception device, or user information concerning a user who has given a command instruction to execute the print job with the print job transmission device.

6. The image forming device as set forth in claim 1, wherein the print condition includes application information concerning an application by which image data included in the print job is generated in the print job transmission device, whose connection to the main body of the image forming device via the network is allowed by the transmission/reception section, said print job transmission device having transmitted the print job to the transmission/reception section.

7. The image forming device as set forth in claim 1, wherein the print condition includes color specifying information in printing an image on the basis of the print job.

8. The image forming device as set forth in claim 1, wherein:

the setting information includes a prohibition table concerning such a combination of a print condition and a sheet type that selection of the combination is prohibited, and the operation control section obtains the order table and the prohibition table from the setting information, and the tray selection section generates the tray selection signal in accordance with the order table and the prohibition table that have been transmitted from the operation control section while excluding a condition indicated by the prohibition table.

9. An image forming device, comprising:

a sheet feeding section, having a plurality of sheet trays capable of storing print sheets of different types therein, which supplies a print sheet from one of the sheet trays;

an operation control section for selecting an order table, based on a print condition, from a plurality of order tables each of which indicates a sheet priority indicating a type of paper corresponding to the print condition, wherein the order table specifies one of the sheet trays; and a tray selection section for selecting one of the sheet trays, in accordance with the order table selected by the operation control section, so as to supply the print sheet from thus selected sheet tray.

10. A print job transmission device, comprising:

a transmission/reception section which functions as an interface to a network; and a print control section for commanding the image forming device as set forth in claim 3, whose connection to the print control section via the network is allowed by the transmission/reception section, to execute a print job including a print condition indicative of a condition for printing, wherein the print control section includes a registration section for registering a registration table, indicative of a sheet type priority indicating a type of paper corresponding to the print condition concerning the image forming device, to a second storage section of the image forming device before commanding the image forming device to execute the print job, so as to cause the image forming device to obtain an order table, indicative of a priority based on the print condition included in the print job, from the registration table in accordance with the print condition included in the print job which the image forming device has been commanded to execute, wherein the order table specifies one of the sheet trays.

11. A print job transmission device, comprising:

a transmission/reception section which functions as an interface to a network; and a print control section for commanding the image forming device as set forth in claim 2, whose connection to the print control section via the network is allowed by the transmission/reception section, to execute a print job including a print condition indicative of a condition for printing, wherein the print control section includes a registration section for registering setting information, indicative of a sheet type priority indicating a type of paper corresponding to the print condition, to a first storage section of a data management device whose connection to the print control section via the network is allowed by the transmission/reception section, before commanding the image forming device to execute the print job, so as to cause the image forming device to obtain an order table, indicative of a priority based on the print condition included in the print job which the image forming device has been commanded to execute, from the first storage section of the data management device, in accordance with the setting information and the print condition included in the print job, wherein the order table specifies one of the sheet trays.

12. A print job transmission device, comprising:

a transmission/reception section which functions as an interface to a network; and a print control section for commanding the image forming device as set forth in claim 1, whose connection to the print control section via the network is allowed by the transmission/reception section, to execute a print job including a print condition indicative of a condition for printing, wherein the print control section includes a command section for adding the print condition having at least any one of (i) device information concerning a main body of the print job transmission device, (ii) user information concerning a user who has given a command instruction to execute the print job by using the main body of the print job transmission device, (iii) application information concerning an application by which image data included in the print job is generated in the main body of the print job transmission device, and (iv) color specifying information in printing an image on the basis of the print job, to the print job so that the print condition is extractable, so as to cause the image forming device, which has been commanded to execute the print job, to select a sheet type in accordance with a priority corresponding to the print condition included in the print job.

13. A data management device, including a transmission/reception section which functions as an interface to a network, whose connection to the image forming device as set forth in claim 2 via the network is allowed by the transmission/reception section, said data management device comprising:

a first storage section for storing setting information indicative of a sheet type priority indicating a type of paper corresponding to a print condition, indicative of a condition for printing, which is included in a print job which the image forming device is commanded to execute; and a control section for managing the setting information.

14. The data management device as set forth in claim 13, wherein the control section includes a registration section for accessing the image forming device and obtaining a registration table, indicative of the setting information concerning the image forming device, from a second storage section of the image forming device, so as to register the registration table to the first storage section.

15. The data management device as set forth in claim 13, wherein the control section includes a registration section for accessing a print job transmission device which commands the image forming device to execute the print job and for obtaining the setting information from a third storage section of the print job transmission device, so as to register the setting information to the first storage section.

16. The data management device as set forth in claim 13, wherein the control section includes a response section for obtaining an order table, indicative of a priority based on the print condition, from the setting information of the first storage section, in response to an inquiry, made by the image forming device, which specifies the print condition, so as to send the order table by return to the image forming device, wherein the order table specifies one of the sheet trays.

17. A computer-readable storage medium, storing a program which causes a computer to function as a print job transmission device provided with a print control section for commanding the image forming device as set forth in claim 3, whose connection to the print control section via a network is allowed by a transmission/reception section which functions as an interface to the network, to execute a print job including a print condition indicative of a condition for printing, wherein the print control section includes a registration section for registering a registration table, indicative of a sheet type priority indicating a type of paper corresponding to the print condition concerning the image forming device, to a second storage section of the image forming device before commanding the image forming device to execute the print job, so as to cause the image forming device to obtain an order table, indicative of a priority based on the print condition included in the print job, from the registration table in accordance with the print condition included in the print job which the image forming device has been commanded to execute, wherein the order table specifies one of the sheet trays.

18. A computer-readable storage medium, storing a program which causes a computer to function as a print job transmission device provided with a print control section for commanding the image forming device as set forth in claim 2, whose connection to the print control section via a network is allowed by a transmission/reception section which functions as an interface to the network, to execute a print job including a print condition indicative of a condition for printing, wherein the print control section includes a registration section for registering setting information, indicative of a sheet type priority indicating a type of paper corresponding to the print condition, to a first storage section of a data management device whose connection to the print control section via the network is allowed by the transmission/reception section, before commanding the image forming device to execute the print job, so as to cause the image forming device to obtain an order table, indicative of a priority based on the print condition included in the print job which the image forming device has been commanded to execute, from the first storage section of the data management device, in accordance with the setting information and the print condition included in the print job, wherein the order table specifies one of the sheet trays.

19. A computer-readable storage medium, storing a program which causes a computer to function as a print job transmission device provided with a print control section for commanding the image forming device as set forth in claim 1, whose connection to the print control section via a network is allowed by a transmission/reception section which functions as an interface to the network, to execute a print job including a print condition indicative of a condition for printing, wherein the print control section includes a command section for adding the print condition having at least any one of (i) device information concerning a main body of the print job transmission device, (ii) user information concerning a user who has given a command instruction to execute the print job by using the main body of the print job transmission device, (iii) application information concerning an application by which image data included in the print job is generated in the main body of the print job transmission device, and (iv) color specifying information in printing an image on the basis of the print job, to the print job so that the print condition is extractable, so as to cause the image forming device, which has been commanded to execute the print job, to select a sheet type in accordance with a priority corresponding to the print condition included in the print job.

20. A computer-readable storage medium, storing a program which causes a computer to function as a data management device whose connection to the image forming device as set forth in claim 2 via a network is allowed by a transmission/reception section which functions as an interface to the network, wherein the data management device includes:

a first storage section for storing setting information indicative of a sheet type priority indicating a type of paper corresponding to a print condition, indicative of a condition for printing, which is included in a print job which the image forming device is commanded to execute; and a control section for managing the setting information.

21. A method for supplying a print sheet from a sheet tray selected from a plurality of sheet trays capable of storing print sheets of different types therein, said method comprising the steps of:

obtaining an order table indicative of a priority based on a desired print condition from setting information, indicative of a sheet type priority indicating a type of paper corresponding to a print condition, that is stored in a storage section, wherein the order table specifies one of the sheet trays; and selecting a sheet tray from the plurality of sheet trays in accordance with the order table so as to supply the print sheet from the sheet tray that has been selected.

* * * * *